(12) United States Patent
Forristall et al.

(10) Patent No.: US 9,653,934 B2
(45) Date of Patent: May 16, 2017

(54) MOBILE DEVICE CASE WITH FINGER GRIPS

(71) Applicants: Kathryn Celeste Forristall, Lafayette, CA (US); Barrett Prelogar, Lake Ozark, MO (US)

(72) Inventors: Kathryn Celeste Forristall, Lafayette, CA (US); Barrett Prelogar, Lake Ozark, MO (US)

( * ) Notice: Subject to any disclaimer, the term of this patent is extended or adjusted under 35 U.S.C. 154(b) by 264 days.

(21) Appl. No.: 14/628,983

(22) Filed: Feb. 23, 2015

(65) Prior Publication Data

US 2015/0245519 A1   Aug. 27, 2015

Related U.S. Application Data

(60) Provisional application No. 61/943,463, filed on Feb. 23, 2014.

(51) Int. Cl.
| | |
|---|---|
| *H04M 1/04* | (2006.01) |
| *H04M 1/02* | (2006.01) |
| *H02J 7/00* | (2006.01) |
| *H04B 1/3888* | (2015.01) |
| *H04B 1/3827* | (2015.01) |
| *H04B 1/3877* | (2015.01) |

(52) U.S. Cl.
CPC ............ *H02J 7/0054* (2013.01); *H04B 1/385* (2013.01); *H04B 1/3877* (2013.01); *H04B 1/3888* (2013.01); *H04M 1/04* (2013.01); *H02J 7/0027* (2013.01); *H04B 2001/3861* (2013.01); *H04M 1/0279* (2013.01)

(58) Field of Classification Search
CPC .... H04B 1/385; H04B 1/3877; H04B 1/3888; H04B 2001/3861; H04M 1/0279; H04M 1/04

See application file for complete search history.

(56) References Cited

U.S. PATENT DOCUMENTS

| | | | |
|---|---|---|---|
| 8,405,981 B2 | 3/2013 | Takemasa et al. | |
| 8,428,662 B2 * | 4/2013 | Palmer ............... | H05K 7/00 348/376 |
| 8,428,664 B1 | 4/2013 | Wyers | |
| 8,479,990 B2 | 7/2013 | Chiarini | |
| 8,528,798 B2 | 9/2013 | Chen | |
| 8,548,536 B1 | 10/2013 | Gunnip | |
| 8,550,317 B2 | 10/2013 | Hyseni | |
| 8,561,862 B2 | 10/2013 | Foggiato | |
| 8,567,832 B2 | 10/2013 | Kannaka | |

(Continued)

*Primary Examiner* — Lewis West
(74) *Attorney, Agent, or Firm* — Erickson Kernell IP, LLC (57) ABSTRACT

A mobile device case with extendable finger grips. The mobile device case couples to a mobile device and includes a pair of pivotable grip wings disposed on a back portion thereof. The grip wings pivot from a stored position that is generally parallel to the back surface of the case to an extended position that is generally perpendicular to the back surface. The grip wings each include a generally rigid frame with a more pliable, cushioned insert disposed therein. The insert provides a plurality of finger slots in which a user's fingers can be disposed to aid holding the mobile device while interacting with an input surface, e.g. a touch screen, using the thumbs. The grip wings can also be extended to support the mobile device in a propped up position on a surface for hands-free viewing.

20 Claims, 7 Drawing Sheets

(56) References Cited

U.S. PATENT DOCUMENTS

| | | |
|---|---|---|
| 8,577,429 B2 | 11/2013 | Linhardt |
| 8,579,112 B2 | 11/2013 | Bethea |
| 8,676,279 B2 | 3/2014 | McCurdy |
| 8,690,211 B2 | 4/2014 | Potter et al. |
| 2005/0205623 A1 | 9/2005 | Buntain |
| 2009/0270050 A1 | 10/2009 | Brown |
| 2011/0065486 A1* | 3/2011 | Bayrami ............... G06F 1/1616 455/575.8 |
| 2011/0084081 A1 | 4/2011 | Chung et al. |
| 2011/0266316 A1 | 11/2011 | Ghalib et al. |
| 2011/0267748 A1 | 11/2011 | Lane et al. |
| 2011/0299231 A1 | 12/2011 | Gaddis, II et al. |
| 2011/0309117 A1 | 12/2011 | Roberts |
| 2012/0031937 A1 | 2/2012 | Baker |
| 2012/0042476 A1 | 2/2012 | Karmatz |
| 2012/0063066 A1 | 3/2012 | Floit |
| 2012/0145863 A1 | 6/2012 | Lin |
| 2012/0262854 A1 | 10/2012 | Robert |
| 2012/0275131 A1* | 11/2012 | Huang .................... G06F 1/166 361/810 |
| 2012/0299318 A1 | 11/2012 | Murphy et al. |
| 2013/0079070 A1 | 3/2013 | Losiewicz |
| 2013/0082471 A1 | 4/2013 | Castorano |
| 2013/0119099 A1 | 5/2013 | Interdonato |
| 2013/0146625 A1 | 6/2013 | Karle et al. |
| 2013/0148271 A1 | 6/2013 | Huang |
| 2013/0277991 A1 | 10/2013 | Wu |
| 2013/0277992 A1 | 10/2013 | Senoff |
| 2013/0279098 A1 | 10/2013 | Cho |
| 2013/0300141 A1 | 11/2013 | Byrne |
| 2014/0084034 A1 | 3/2014 | Wangercyn, Jr. et al. |
| 2015/0111621 A1* | 4/2015 | Smith .................. H04B 1/3888 455/575.1 |
| 2016/0020809 A1* | 1/2016 | Joslin .................. H04B 1/3888 455/575.6 |
| 2016/0036480 A1* | 2/2016 | Hirsch .................. H04B 1/385 455/575.6 |
| 2016/0049983 A1* | 2/2016 | Ripka .................... H04B 1/385 455/575.6 |
| 2016/0072540 A1* | 3/2016 | Davis ...................... H04N 5/77 2/69 |
| 2016/0234364 A1* | 8/2016 | Qian ....................... H04B 1/38 |
| 2016/0255946 A1* | 9/2016 | Van der Velden ........ A45F 5/00 |

* cited by examiner

MOBILE DEVICE CASE WITH FINGER GRIPS

CROSS-REFERENCE TO RELATED APPLICATIONS

This application claims the benefit of U.S. Provisional Patent Application No. 61/943,463, filed Feb. 23, 2014, the disclosure of which is hereby incorporated herein in its entirety by reference.

BACKGROUND

Interaction with and use of cell phones, smart phones, tablet computing devices, and similar devices is often reliant on the user typing text inputs on a virtual keyboard displayed on the screen of the device. The keyboard is typically displayed along a bottom portion of the screen to enable a user to type using one or both of their thumbs while grasping the device along one or both sides often while resting the phone on one or both pinkie fingers. Or the user might hold the device in one hand while typing with a finger of the opposite hand. In either instance, it is common for the user to use a light grip on the device to provide greater comfort and easier movements for typing. This opens the door to an increased risk of dropping the device and potentially damaging or breaking the device. Additionally, news is increasingly consumed on mobile devices and they are often the first thing people reach for in the morning. Whether lying in bed holding a phone overhead to read, or during a commute while standing and scrolling through content with one hand, there is no comfortable grip for lengthy usage of a mobile device.

Commonly users install a protective case on their mobile device to protect against damage, but many cases are not adequate to fully protect the device from damage resulting from the device being dropped. A protective case or apparatus that can be coupled to a mobile device and that provides an engagement with the hand or fingers of the user to substantially reduce the risk of the device being dropped is needed in the art. Such a case or apparatus that can also function to prop the device up in a standing position for longer term viewing would also be beneficial.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, retractable finger grips for a mobile device.

The finger grips may be integrated in a protective case for a mobile device or may be configured for installation on the mobile device or over another existing protective case. A base is provided that is configured to couple at least between a pair of opposite edges of the mobile device, typically near a bottom end of the device. A pair of grip wings are pivotably coupled the base adjacent the opposite edges of the mobile device. The grip wings are thus pivotable toward one another to lie flat against the base or away from one another to extend substantially perpendicularly from the base and from the back side of the mobile device. A distal edge of the grip wings includes an undulated perimeter that forms a series of finger slots into which a user can insert their fingers when the grip wings extend from the base. As such, with their fingers engaged in one or more of the finger slots, the user can hold the mobile device with one or both hands while typing thereon with a greatly reduced risk of dropping the mobile device due to a snug engagement between the user's fingers and the finger slots. The grip wings may include inserts or be formed from soft pliable materials to increase grip and comfort provided by the finger slots.

When extended, the grip wings may also function as a kick-stand that aids to prop up the mobile device when placed on a surface. Conversely, when folded against the base, the grip wings do not substantially limit insertion of the mobile device in, for example, a pocket or bag.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Embodiments of the invention are described herein with respect to the drawings in which reference numerals are employed to identify particular components or features. Similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate the features or elements are necessarily the same.

With initial reference to FIGS. 1-6, a mobile device case with extendable finger grips is indicated generally by the reference numeral 10 and is referred to herein as the case 10. The case 10 is shown and described herein for use with a mobile device 12 such as a smart phone like the IPHONE from Apple Inc. of Cupertino, Calif. or the GALAXY from Samsung Electronics Co., Ltd. of Suwon, South Korea, among others. But the case 10 may be configured for use with other mobile devices and mobile computing devices including, for example and not limitation, cell phones, tablet computers, laptop computers, MP3 players, and gaming devices. As shown and described herein, the case 10 is configured to enclose a substantial portion of the mobile device 12, e.g. an entire back surface and perimeter thereof. In another embodiment, the case 10 is configured to enclose or extend across only a portion of the mobile device 12. For example, the case 10 may extend only between a pair of opposite edges of the mobile device 10 to cover only a lower portion of the back side of the mobile device 12. As depicted in FIGS. 1-6, the case 10 is configured to couple directly to the mobile device 12, but in some embodiments the case 10 can be configured to couple to or over another protective case that is pre-installed on the mobile device 12.

The case 10 comprises a body 14 with a pair of grip wings 16 pivotably coupled thereto. The body 14 includes a back panel 18 having dimensions that mimic those of the mobile device 12 on which the case 10 is to be installed. A peripheral rim 20 extends forwardly from the perimeter of the back panel 18 to at least partially wrap around the edges of the mobile device 12 and to engage the edges or a front surface of the mobile device 12. The body 14 is retained on a back of the mobile device 12 by engagement of the rim 20 with the edges or front surface of the mobile device 12. The rim 20 and the back panel 18 may be adapted to accommodate buttons, sensors, cameras, charging/data ports, speaker jacks, or the like on the mobile device 12 by providing apertures, pass-through buttons, or the like.

Figure 4:
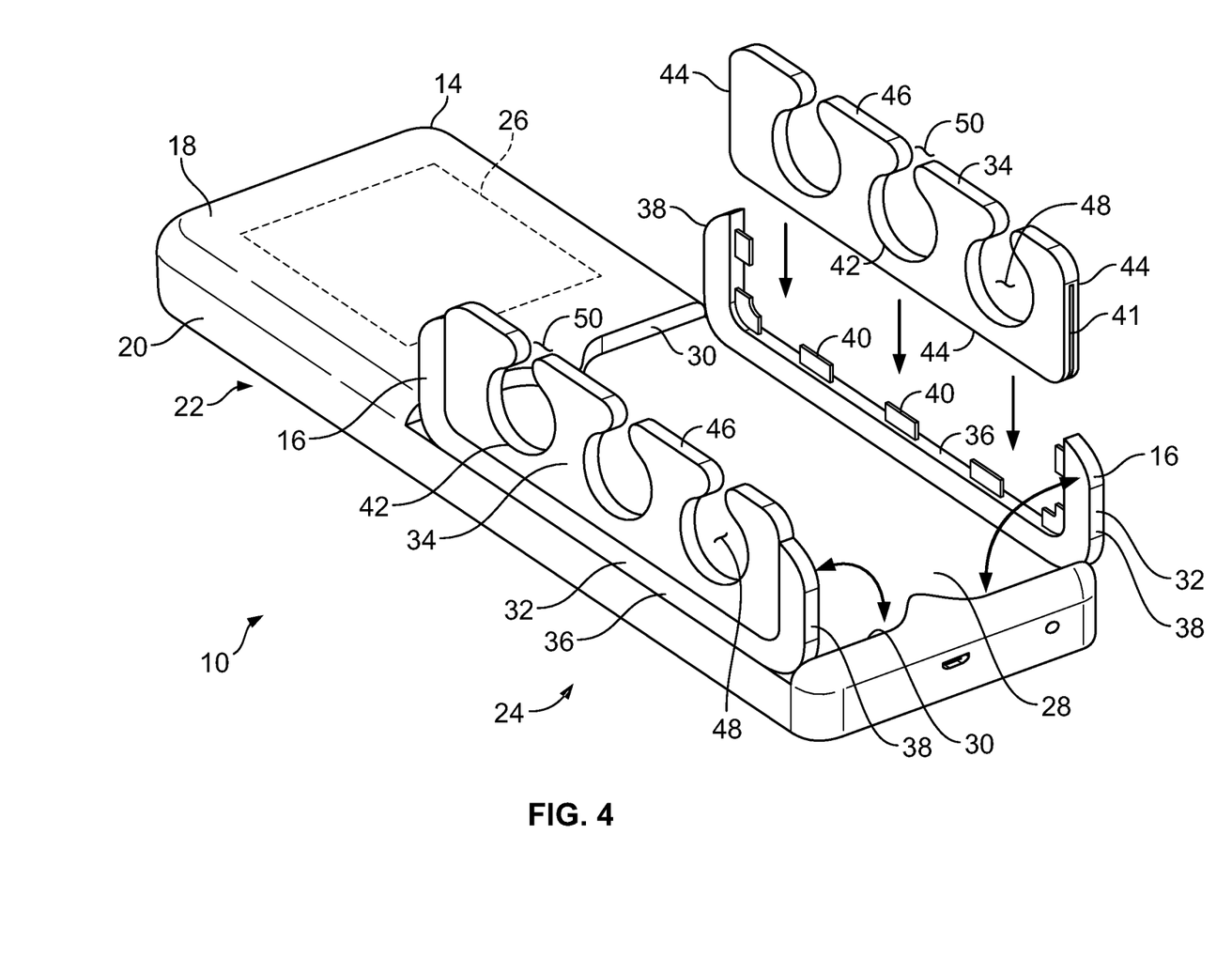
FIG. 4 is a perspective view of the case of FIG. 1 depicting a pair of grip wings in an extended position and a grip insert disconnected from a frame of the grip wing in accordance with an embodiment of the invention.

The back panel 18 includes an upper portion 22 and a lower portion 24. The upper portion 22 may comprise a planar section of material that encloses the associated portion of the mobile device 12. The upper portion 22 might have a thickness that is substantially equal to that of the grip wings 16 included in the lower portion 24 so as to provide the case 10 with a generally continuous back surface. As depicted in FIG. 4, the upper portion 22 may include a backup battery 26 or battery charging device disposed therein that is configured to provide the mobile device 12 with additional battery power reserves or that can be used to recharge a battery that is integral with the mobile device 12.

The lower portion 24 includes a panel or base 28 that at least partially encloses an associated portion of the mobile device 12 and to which the grip wings 16 are pivotably coupled. The base 28 includes a shoulder 30 disposed at each longitudinal end, e.g. adjacent the upper portion 22 and adjacent the lower end of the case 10. The shoulder 30 extends from the base 28 a distance approximately equal to the thickness of the grip wings 16 to provide the case 10 with a generally continuous back surface and to provide structure to which the grip wings 16 can be coupled to the case 10 as described below. An upper shoulder 30 may be formed by the terminal edge of the upper portion 22. In another embodiment, the case 10 does not include the upper portion 22 and the shoulder 30 comprises a flange extending outwardly from the base 28.

Preferably two grip wings 16 are provided, mounted in opposing orientations on the base 28, but only one grip wing 16 may be provided in some embodiments. Each grip wing 16 includes a frame member 32 and an insert 34. The frame 32 includes a longitudinal member or spine 36 with a laterally extending member or arm 38 disposed at each end thereof and extending generally perpendicularly to the spine 36. The spine 36 extends substantially the longitudinal length of the base 28 and the arms 38 extend therefrom a distance less than about half the width of the case 10. The frame 32 thus has a generally U- or channel-shaped configuration.

A plurality of tabs 40, clips, flanges, or the like may be provided on one or both of the spine 36 and the arms 38 for coupling with the insert 34. The tabs 40 may include one or more ridges, enlarged portions, teeth, or similar features configured to engage corresponding apertures 41 in the insert 34 to retain an engagement therebetween by mechanical and/or frictional engagement. In one embodiment, the inserts 34 are formed integral with the frame 32. For example the insert 34 may be molded with the frame 32 as a single unitary component, or the insert 34 may be overmolded on the frame 32, among other methods.

The inserts 34 are comprised of a resilient, pliable material that enables at least partial flexure thereof while also providing a softness and/or tackiness for comfort and gripping by a user's fingers. For example, the inserts 34 may be comprised of a neoprene, foam rubber, rubber, plastic, composite material, among other materials or combinations thereof; in some embodiments, the inserts 34 may be formed by over-molding a softer material over a more rigid material or internal frame to provide desired shape retention as well as desired surface properties like comfort and tackiness.

The inserts 34 have a generally rectangular form with three coupling edges 42 thereof being generally linear and configured to abut the spine and arms 36, 38 of the frame 32. A fourth edge 44 of the insert 34 includes one or more undulations, scallops, tabs, notches, or other profiles that form one or more finger slots 46. Preferably, three finger slots 46 are formed side-by-side and spaced longitudinally along the insert 34. The finger slots 46 each include a generally circular or ovate finger-receiving portion 48 that is open to the fourth edge 44 of the insert 34. As such, the user's finger can be inserted into the finger slot 46 by moving coaxially through the finger-receiving portion 48 or by moving perpendicular to the fourth edge 44 and through the opening of the finger slot 46 to the finger-receiving portion 48.

The finger-receiving portion 48 of the finger slot 46 extends between about 30° and about 180° around the user's finger, or preferably between about 30° and about 270° around the user's finger, or more preferably between about 30° and about 330° around the user's finger. Configurations in which the finger-receiving portion 48 extends greater than about 180° around a user's finger disposed therein may provide resistance to withdrawal of the user's finger from the finger slot 42 and thereby provide additional resistance to inadvertently dropping the case 10 and/or mobile device 12 disposed therein.

Figure 9:
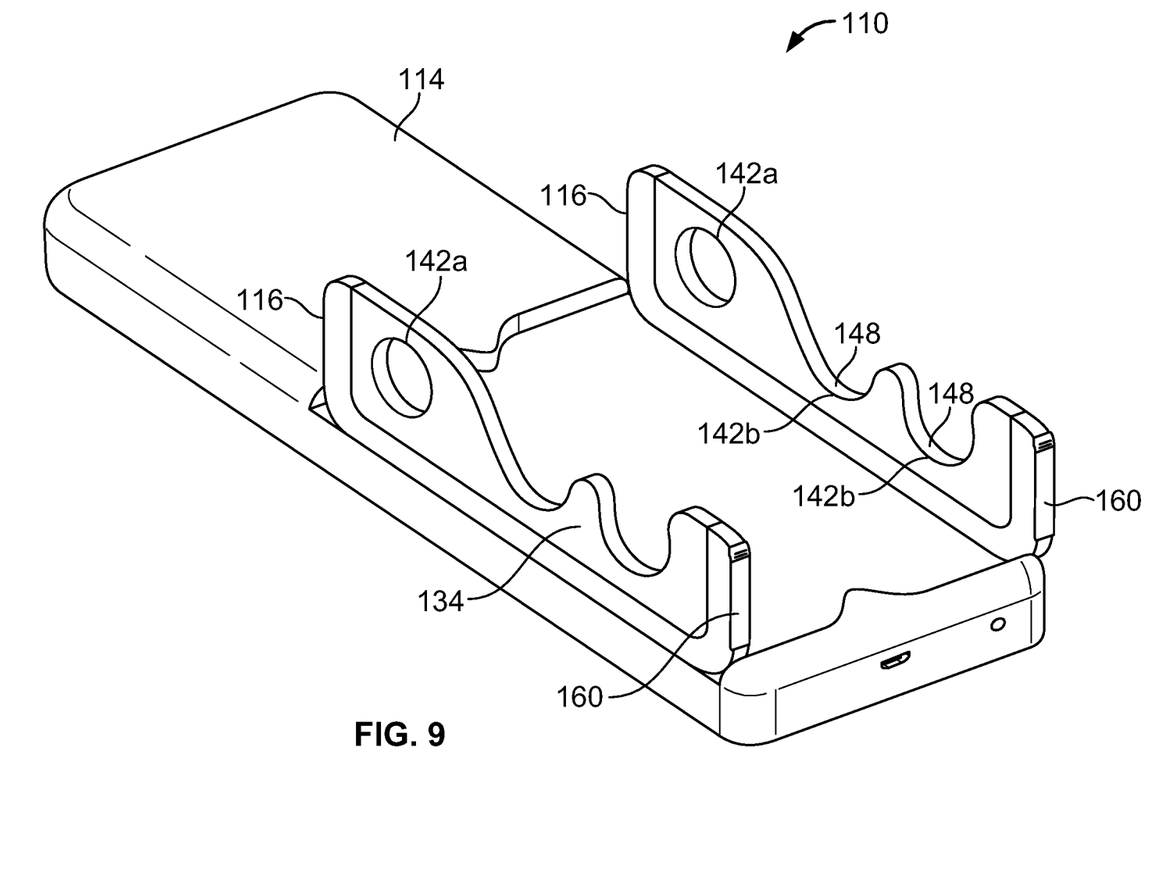
FIG. 9 is a perspective view of a mobile device case with finger grips depicted in accordance with another embodiment of the invention.
Figure 10:
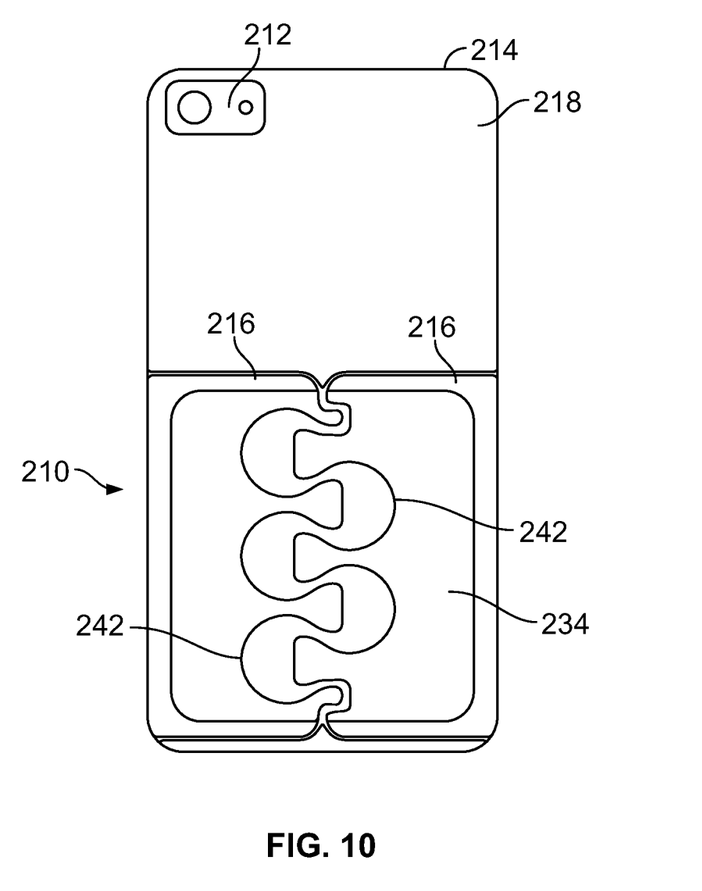
FIG. 10 is a back side plan view of a mobile device case having offset finger slots on opposing grip wings depicted in accordance with another embodiment of the invention.

The finger slots 42 are preferably dimensioned to provide a snug fit around the user's fingers when inserted therein; the inserts 34 are preferably at least partially compressed in areas surrounding the finger slots 42 when the user's fingers are disposed therein. Each of the finger slots 42 may be configured with substantially the same dimensions and may be equally spaced apart or the dimensions and spacing of the finger slots 42 may vary. For example, the finger slots 42 may be tailored to receive particular fingers of a user's hand, different sized user hands/fingers, and/or to provide desired tightness of the fit around a user's finger; the inserts 34 may be separately configured for use by women having smaller hands/fingers and for men having larger hands/fingers. As depicted in FIG. 9, in one embodiment, a case 110 may be configured with an insert 134 in which one or more finger slots 142*a* are comprised of a ring or loop and one or more other finger slots 142*b* whose finger-receiving portions 148 comprise depressions; in some embodiments, the finger slots 142 comprise all rings or loops like the finger slot 142*a*. In another embodiment depicted in FIG. 10, a case 210 includes grip wings 216 in which the finger slots 242 of one grip wing 216 are longitudinally offset relative to the finger slots 242 of the opposite grip wing 216 to allow the user's fingers to interlace between the grip wings 216.

The coupling edges 44 of the inserts 34 may include apertures 41 configured to receive and engage the tabs 40 on the frame 32 as described previously. The inserts 34 may be removeably coupled to the frames 32 to enable interchanging of inserts 34 of various configurations, e.g. various colors and finger slot 42 arrangements or sizes. In another embodiment, the inserts 34 may be fixedly coupled to the frames 32 such as by gluing or welding.

A variety of arrangements for coupling the grip wings 16 to the case 10 will be understood by one of skill in the art and are understood as falling within the scope of this description. In the embodiment depicted in FIGS. 1-6, the shoulders 30 include a blind hole 52, aperture, or depression located adjacent each lateral end thereof, e.g. near the lateral edges of the case 10. The frames 32 include studs 54 that correspond with the blind holes 52 and that are received in the blind holes 52. The studs 54 are rotatable within the blind holes 52 to enable the frames 32 and grip wings 16 to pivot about an axis formed between the blind holes 52/studs 54 at each end of the frame 32. The grip wings 16 can thus be pivoted between a stored position (FIGS. 1 and 2) in which the grip wings 16 lie substantially parallel to and against or adjacent the base 28 and an extended position in which the grip wings 16 extend substantially perpendicularly from the base 28 (FIG. 4).

Stops, indentations, or similar features (not shown) may be provided on the shoulder 30 or the base 28 that restrict or resist pivoting of the grip wings 16 beyond the extended position, e.g. beyond a perpendicular orientation, and/or to provide a bias or resistance that aids to maintain the grip wings 16 in the stored position and/or the extended position. The bias or resistance to maintain the stored and/or extended positions may also be provided by an over-center condition produced by location of the blind holes 52 and studs 54 relative to the base 28 and to the form or dimensions of the frame 32, e.g. pivotal movement of the frame 32 may be at least partially obstructed by the base 28 causing the frame 32 and/or studs 54 to at least partially flex to allow movement between the stored and extended position. Stops or similar features may also be included to enable the grip wings 16 to be positioned in one or more intermediate positions between the stored position and the extended position.

In use, the case 10 is coupled to the mobile device 12 by installing the mobile device 12, backside first, into a space formed by the rim 20 of the case 10. The rim 20 extends alongside and/or at least partially around the edges of the mobile device 12 to frictionally or mechanically engage the edges of the device 12. As such, the case 10 encloses the edges and back side of the mobile device 12 and at least partially protects those surfaces from damage like scratching, wearing, marring, chipping, or the like. The case 10 may also at least partially protect the mobile device from impact damage caused by dropping or hitting the mobile device 10 against a surface. In another embodiment, the case 10 and/or the rim 12 only covers a portion of the mobile device 12 and thus only provides at least partial protection to those covered portions.

Figure 1:
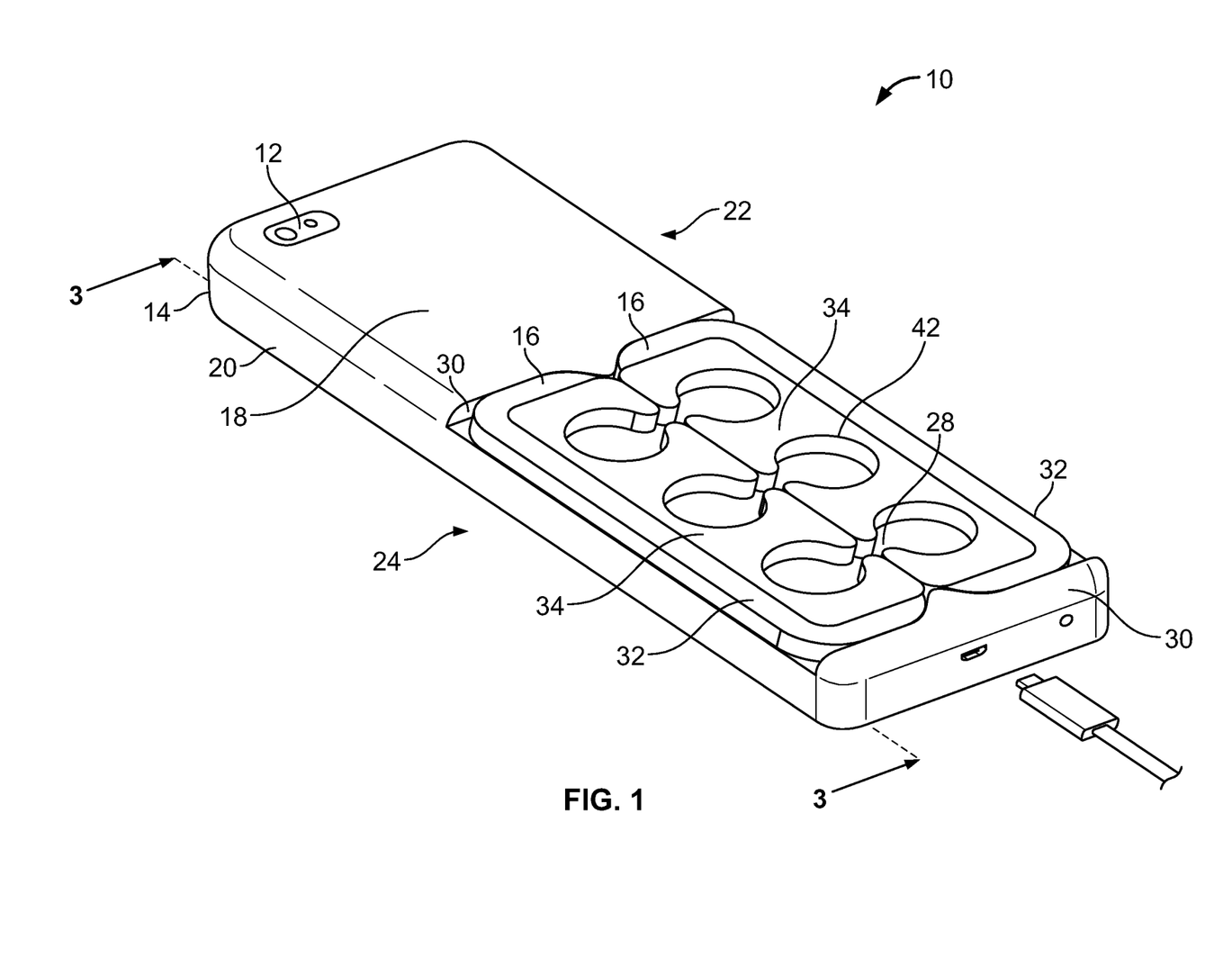
FIG. 1 is a perspective view of a mobile device case with retractable finger grips depicted in accordance with an embodiment of the invention.
Figure 2:
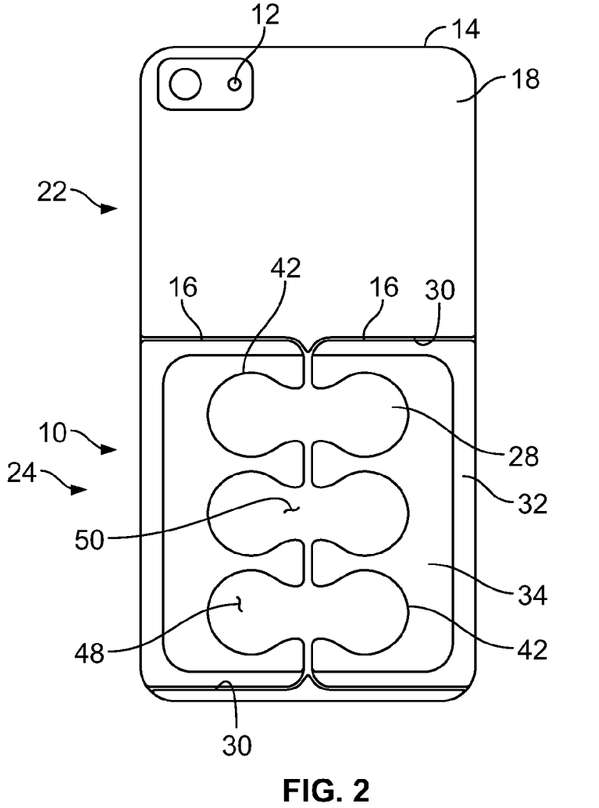
FIG. 2 is a plan view of the case of FIG. 1.
Figure 3:
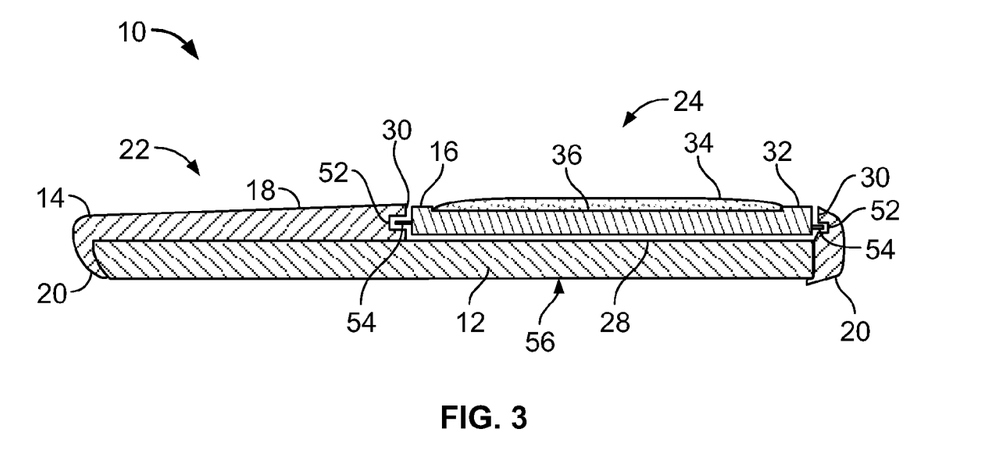
FIG. 3 is a cross-sectional view of the case of FIG. 1 taken along the line 3-3 in FIG. 1.
Figure 5:
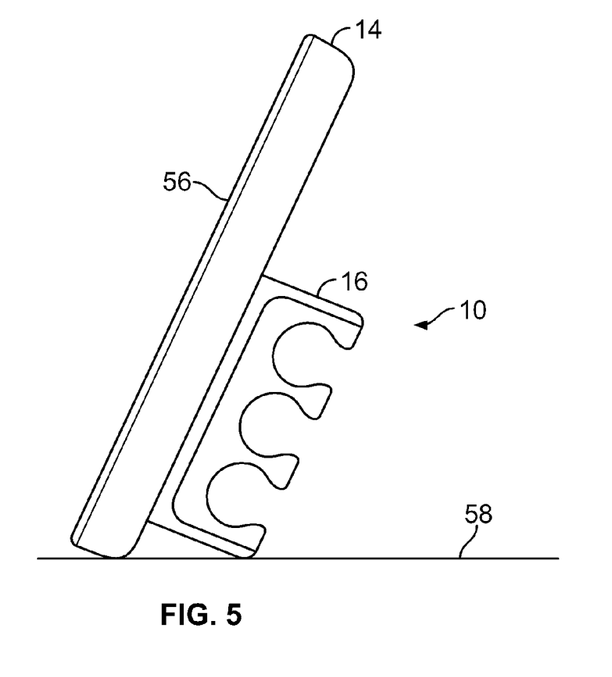
FIG. 5 is side elevational view of the case of FIG. 1 with the grip wings in the extended position and propping up the mobile device case on a surface in a portrait orientation.
Figure 6:
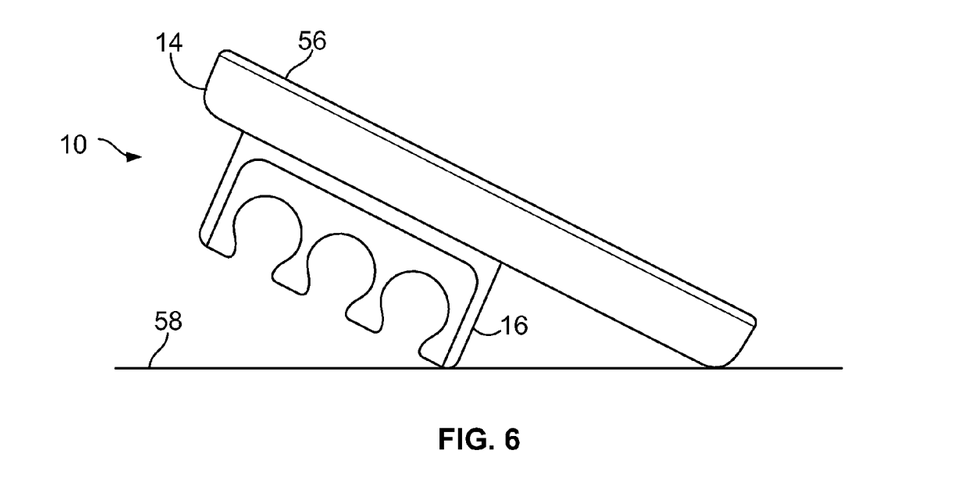
FIG. 6 is a side elevational view of the case of FIG. 5 depicting the case being propped in the portrait orientation but with the case in an inverted orientation as compared to that depicted in FIG. 5.

As depicted in FIGS. 1-3, in the stored position, the grip wings 16 are placed in a non-obstructive position generally parallel to the base 28 of the lower portion 24. The overall back surface of the case 10 is thus provided with a substantially continuous form. This provides ease of handling of the mobile device 12 and case 10 during normal use of the device 12 and storing of the device 12 and case 10 in a pocket, purse, handbag, or the like. The mobile device 12 may be used with the grip wings 16 in the stored position, such as when making a phone call, or the grip wings 16 can be moved to the extended position, as depicted in FIGS. 4-6.

To extend the grip wings 16 from the stored position to the extended position, the grip wings 16 are simply pivoted about their coupling with the base 28, e.g. pivoted about the coupling of the studs 54 with the blind holes 52. The grip wings 16 are preferably pivoted approximately 90° to extend generally perpendicularly from the base 28 but other degrees of pivot may be devised. When stops or over-center conditions are provided in association with the grip wings 16 and the base 28 or shoulder 30, such conditions may aid to bias or releaseably lock the grip wings 16 in one or both of the stored and extended positions.

In the extended position, a user can insert one or more fingers into respective ones of the finger slots 42. Fingers from both hands of the user can be engaged in the respective ones of the finger slots 42 or only fingers from one hand may be engaged. Engagement of the user's fingers with the finger slots 42 places the user's hand in a desirable position relative to the mobile device 12 in which the user's thumb or thumbs are free to move over and interact with an input portion 56, such as a touch-sensitive screen of the mobile device 12 without also being required to hold the mobile device 12 against dropping. The user is thus enabled to freely type or otherwise interact with the input portion 56 of the mobile device 12 with a greatly reduced risk of dropping the device 12 due to engagement of the user's fingers with the grip wings 16.

Some users may find it comfortable or desirable to insert one or more of the fingers on one hand into the finger slots 42 with one or more of the remaining fingers positioned below the grip wing 16. The finger positioned immediately below the grip wing 16 may abut the lower arm 38 of the grip wing frame 32 and thus may provide at least partial support of the mobile device 12/case 10 in addition to that provided by the fingers positioned in the finger slots 42. As depicted in FIG. 9 on the case 110, a pad 160 comprised of a cushioning and/or frictional material may be applied to or integrated with an exterior surface of the lower arm 138 to provide additional comfort and/or grip to the finger positioned below the grip wing 116.

The case 10 may be employed to prop up the mobile device 10 on a surface 58 for hands-free viewing of a screen on the mobile device 12 such as when viewing a video or movie displayed thereon. As depicted in FIG. 5, the mobile device 12 may be propped up in a portrait orientation, e.g. a longer dimension of the mobile device 12 extending perpendicularly to the surface 58, by placing a bottom edge of the mobile device 12 or case 10 and at least a portion of the arms 38 located proximate the bottom edge of the mobile device 12 into contact with the surface. Alternatively, as depicted in FIG. 6, the mobile device 12 or case 10 may be inverted to support the device 12/case 10 on the opposite arms 38 and the opposite or top end of the mobile device 12/case 10. This second orientation may provide a more shallow angle or tilt to the mobile device 12/case 10. Surfaces of the frame 32 that may come into contact with the surface 58 may be provided with skids, pads, or other frictional or cushioning materials to provide resistance to sliding along the surface 58 and/or damaging the surface 58 when the device 12/case 10 is in the propped up position.

Figure 7:
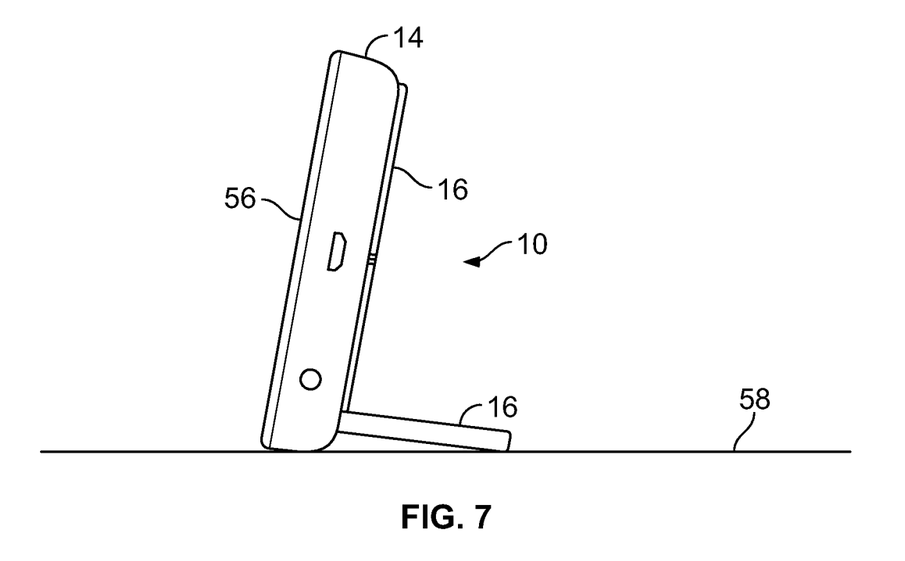
FIG. 7 is an end elevational view of the case of FIG. 1 with the grip wing nearest a surface in the extended position and propping up the mobile device case on the surface in a landscape orientation.
Figure 8:
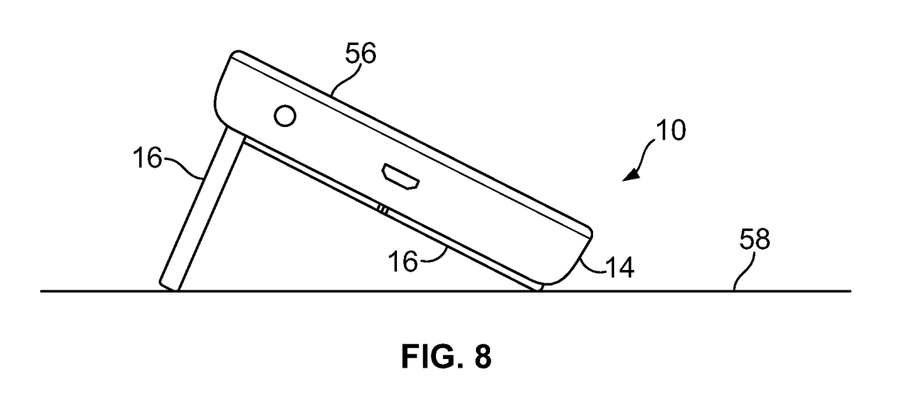
FIG. 8 is an end elevational view of the case of FIG. 7 with the opposite grip wing in the extended position and propping up the mobile device case on the surface in the landscape orientation.

The case 10 may also be supported in a landscape orientation, e.g. the longer dimension of the mobile device 12 extending parallel to the surface 58, by placing a side edge of the mobile device 12 or the case 10 and a distal edge of the grip wing 16 (in the extended position) that is closest to the supporting side of the mobile device 12/case 10 into contact with the surface 58, as depicted in FIG. 7. Alternatively, as depicted in FIG. 8, the mobile device 12/case 10 may be supported in the landscape orientation at a more shallow angle by supporting the mobile device 12/case 10 with the grip wing 16 that is furthest from the supporting side of the device 12/case 10.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A holder for a mobile device comprising:
a base that is securable to a back side of the mobile device by engaging at least a pair of opposing edges thereof, the base extending at least between the opposing edges and providing a first shoulder and a second shoulder that is spaced apart from the first shoulder;
a grip wing frame pivotably coupled between the first shoulder and the second shoulder, the grip wing frame being pivotable between a stored position in which the grip wing frame lies substantially parallel to the base and an extended position in which the grip wing frame extends from the base in a substantially perpendicular plane;
a grip wing insert removeably coupled to the grip wing frame and including a plurality of finger slots formed therein, each of the finger slots being configured to receive a finger of a user.

2. The holder of claim 1, wherein the grip wing insert is comprised of a resilient, at least partially compressible material.

3. The holder of claim 2, wherein the grip wing insert is at least partially compressed in an area adjacent the finger slot when a user's finger is inserted therein.

4. The holder of claim 1, wherein the grip wing frame is comprised of a substantially rigid material.

5. The holder of claim 1, wherein the grip wing insert is a first grip wing insert and the first grip wing insert is replaceable with a second grip wing insert configured with fingers slots of different dimensions than the finger slots of the first grip wing insert.

6. The holder of claim 1, wherein the grip wing frame and the grip wing insert include a plurality of mating tabs and apertures that are engageable to removeably couple the grip wing insert with the grip wing frame.

7. The holder of claim 1, wherein the base is coupled to a mobile device, the grip wing frame is pivoted to the extended position, and wherein the mobile device is supported on a surface by the grip wing frame in a propped-up position.

8. The holder of claim 1, wherein the base includes a first portion and a second portion, the first portion extending between and including the first and second shoulders, the first shoulder being adjacent a first end of the mobile device, the second shoulder being positioned between the first end and an opposite second end of the mobile device, the second portion extending from the second shoulder to the second end of the mobile device, and wherein the first portion is configured to provide a substantially continuous surface profile to a back side of the holder between the first and second ends of the mobile device.

9. The holder of claim 8, wherein one of a battery and a charging device is disposed within the second portion of the base, the one of the battery and charging device configured to provide electrical power to the mobile device.

10. A holder for a mobile device comprising:
a base that is securable to a back side of the mobile device by engaging at least a pair of opposing sides thereof, the base extending at least between the opposing sides and providing a first shoulder and a second shoulder that is spaced apart from the first shoulder;
a first and a second grip wing frame pivotably coupled between the first shoulder and the second shoulder, the first frame being coupled adjacent a first edge of the base and the second frame being coupled adjacent an opposite second edge of the base, the first and second frames each including a spine extending between the first and second shoulders and an arm at each end of the spine extending at a right angle to the spine, the first and second frames being pivotable between a stored position in which the first and second frames lie substantially parallel to the base with their arms directed toward one another and an extended position in which the first and second frames extend from the base with their arms extended substantially perpendicularly away from the base;
a first and a second grip wing insert removeably coupled to the spine and between the arms of the first and second frames, respectively, and including a plurality of finger slots formed therein, each of the finger slots being configured to receive a finger of a user.

11. The holder of claim 10, wherein the first and second frames include a plurality of first coupling elements on one or both of the spine and the arms, and wherein the first and the second inserts include second coupling elements configured to mate with the first coupling elements located about the perimeter of the first and second inserts.

12. The holder of claim 10, wherein the first and the second inserts are comprised of a resilient, at least partially compressible material, and wherein the first and the second inserts are at least partially compressed in an area adjacent the respective finger slot when a user's finger is inserted therein.

13. The holder of claim 10, wherein the first and the second inserts are replaceable with a third and a fourth insert respectively, the third and the fourth inserts providing one or more of fingers slots of a different configuration than those of the first and the second inserts, different aesthetic appearance than the first and the second inserts, and a material composition different than that of the first and the second inserts.

14. The holder of claim 10, wherein one or both of the first and the second frames are in the extended position, and wherein a distal end of at least one of the arms of the first and the second frame supports the holder in a propped-up position on a surface.

15. The holder of claim 10, wherein at least one of the finger slots comprises an enclosed aperture into which a user's finger can be inserted.

16. The holder of claim 10, wherein one or more of the finger slots includes a finger receiving portion dimensioned to receive a user's finger therein and to at least partially encircle the user's finger, the finger receiving portion being open to the perimeter of the respective first or the second insert via an open portion, the open portion having a width dimension that is less than a corresponding width dimension of the user's finger.

17. A holder for a mobile device comprising:
a case that is securable over a back side of the mobile device, the case including a body dimensioned to substantially enclose the back side of the mobile device and a rim extending forward from the perimeter of the body, the rim engaging at least a portion of a perimeter of the mobile device, the case including an upper portion and a lower portion, the lower portion providing a first shoulder adjacent a first end of the mobile device and a second shoulder that is spaced apart from the first shoulder toward an opposite second end of the mobile device;
a first and a second grip wing frame pivotably coupled between the first shoulder and the second shoulder, the first frame being coupled adjacent a first edge of the case and the second frame being coupled adjacent an opposite second edge of the case, the first and the second frames each including a spine extending between the first and the second shoulders and an arm at each end of the spine extending at a right angle to the spine, the first and the second frames being pivotable between a stored position in which the first and the second frames lie substantially parallel to the case with their arms directed toward one another and an extended position in which the first and the second frames extend from the case with their arms extended substantially perpendicularly away from the case;
a first and a second grip wing insert removeably coupled to the spine and between the arms of the first and the second frames, respectively, and including a plurality of finger slots formed therein, each of the finger slots being configured to receive a finger of a user.

18. The holder of claim 17, wherein one or both of the first and the second frames are in the extended position, and wherein a distal end of at least one of the arms of the first and the second frame supports the holder in a propped-up position on a surface.

19. The holder of claim 17, wherein one or more of the finger slots includes a finger receiving portion dimensioned to receive a user's finger therein and to at least partially encircle the user's finger, the finger receiving portion being open to the perimeter of the respective first or the second insert via an open portion, the open portion having a width dimension that is less than a corresponding width dimension of the user's finger.

20. The holder of claim 17, wherein at least one of the finger slots comprises an enclosed aperture into which a user's finger can be inserted.

* * * * *